United States Patent
Watson

[19]

[11] Patent Number: 6,010,338
[45] Date of Patent: Jan. 4, 2000

[54] MAGNETIC FRAME KIT

[76] Inventor: Kelly H. Watson, 2620 Eastwood Ave., Richland, Wash. 99352

[21] Appl. No.: 08/988,549

[22] Filed: Dec. 10, 1997

Related U.S. Application Data

[63] Continuation of application No. 08/758,428, Nov. 29, 1996, abandoned.

[51] Int. Cl.[7] ............................... G09B 11/10; G09F 1/00
[52] U.S. Cl. ................................ 434/81; 434/73; 434/84; 40/124.04
[58] Field of Search ................................ 40/124.04, 711; 434/73, 81, 84, 168, 430

[56] References Cited

U.S. PATENT DOCUMENTS

| | | |
|---|---|---|
| 1,447,379 | 3/1923 | Furste . |
| 1,562,225 | 11/1925 | Garman . |
| 1,698,739 | 1/1929 | Shulman . |
| 2,592,078 | 4/1952 | Taylor et al. ............................... 46/22 |
| 3,274,706 | 9/1966 | Friend ........................................ 35/20 |
| 3,432,961 | 3/1969 | Goldfarb .................................... 46/37 |
| 3,433,485 | 3/1969 | Renn et al. .............................. 273/157 |
| 3,553,062 | 1/1971 | Berlin ........................................ 161/18 |
| 3,581,882 | 6/1971 | Bish .......................................... 206/1.7 |
| 3,726,026 | 4/1973 | Borcherding ................................ 35/62 |
| 3,839,130 | 10/1974 | Dean et al. ............................... 161/18 |
| 3,964,750 | 6/1976 | Brown ...................................... 273/157 |
| 4,176,473 | 12/1979 | Rae ......................................... 35/35 E |
| 4,514,175 | 4/1985 | Zaruba et al. ............................. 434/82 |
| 4,811,951 | 3/1989 | Dorsey-Zinn et al. ............. 273/157 R |
| 4,828,497 | 5/1989 | Kurgan ...................................... 434/96 |
| 4,838,793 | 6/1989 | Taylor ..................................... 434/168 |
| 5,106,305 | 4/1992 | Grant ........................................ 434/84 |
| 5,158,295 | 10/1992 | Shilling .............................. 273/157 R |
| 5,203,847 | 4/1993 | Butt ..................................... 273/157 R |
| 5,261,174 | 11/1993 | Blegen ..................................... 40/152 |
| 5,375,351 | 12/1994 | King et al. .......................... 40/124.04 |
| 5,439,220 | 8/1995 | Hendricks ................................ 273/155 |
| 5,666,712 | 9/1997 | Cvetkov .................................... 29/458 |

Primary Examiner—Paul J. Hirsch
Assistant Examiner—Michael B. Priddy
Attorney, Agent, or Firm—Seed and Berry LLP

[57] ABSTRACT

A coloring kit project for children producing magnetic frames for photographs and art work. The frame is composed of a flexible magnetic material suitable having designs for coloring or decoration which will adhere to a ferrous surface such as the door of a refrigerator. The invention focus is in particular on a magnetic frame kit composed of a plurality of printed outlines of frames with designs on a single sheet of flexible magnetic material and a plurality of decorative elements on a single sheet of flexible magnetic material which will magnetically adhere to either a magnetic frame or to a ferrous surface. Children will cut the magnetic frames and the decorative elements from the respective magnetic frame kit material sheets, will color the respective designs and use the resulting frame to display art work.

7 Claims, 9 Drawing Sheets

MAGNETIC FRAME KIT

CROSS-REFERENCES TO RELATED APPLICATIONS

This application is a Continuation of U.S. patent application Ser. No. 08/758,428, filed Nov. 29, 1996, now abandoned.

FIELD OF THE INVENTION

The disclosure relates generally to a coloring kit project for children producing frames for photographs and art work. The framesis composed of a flexible magnetic material suitable for coloring or decoration which will adhere to a ferrous surface such as the door of a refrigerator. The invention focus is in particular on a magnetic frame kit composed of a plurality of printed outlines of frames with designs on a single sheet of flexible magnetic material and a plurality of decorative elements on a single sheet of flexible magnetic material which will magnetically adhere to either a magnetic frame or to a ferrous surface.

BACKGROUND OF THE INVENTION

An activity display board using a magnetic strip to retain the board to a ferrous surface and provide a surface for the display of art produced primarily by children is disclosed by U.S. Pat. No. 4,838,793 to Taylor.

SUMMARY OF THE INVENTION

The present invention discloses a magnetic frame and magnetic frame kit with magnetic frames and decorative elements where the magnetic frame and decorative elements are formed on a magnet frame kit material sheet having a surface attractive to ferrous material and a surface upon which designs may be printed and which receives colors. The magnetic frame kit material sheet may be composed, for example as provided for herein, of two layers; one layer being a flexible magnetic material and a second layer being an art medium generally comprised, for example as in this disclosure, of paper. The art medium layer will have a surface upon which designs may be printed and upon which colors and art may be applied. Designs to be printed upon the art medium surface will include designs of frames for photographic and art work and designs of decorative elements where the decorative element is a component separate from a frame and which is expected to be used to decorate the surface of a frame or to be placed in the vicinity of a frame as disclosed.

When the design forms a frame, denominated in this disclosure as a magnetic frame, the art medium surface is denominated a frame art area surface. When the design forms a decorative element the art medium surface is denominated a decorative element art area surface. The magnetic frame has a generally centrally positioned aperture from the magnetic surface to the frame art area surface forming a frame opening which will permit the magnetic frame to display a variety of art works, photographs and other visual art compositions.

Decorative elements disclosed herein may include, for example, designs in the shape of and with the printed outline of a holly leaf and holly berry. Other designs or shapes may include an automobile, soccer ball or other design and shape which is generally of a size as to be able to be placed upon the frame art area surface of a magnetic frame or in the vicinity of a magnetic frame. The decorative element may be used independently of the magnetic frame. Both magnetic frames and decorative elements may be included in the kit in a sheet format with a kiss cut around the respective frame perimeters, frame opening and decorative element perimeters where the respective magnetic frame and or decorative element may be easily pushed out of or separated from the sheet. Alternatively the person completing the kit may cut the frame from the magnetic frame kit material along a frame perimeter. The decorative element may likewise be cut from the magnetic frame kit material along a decorative element perimeter.

The invention is intended to be presented as a magnetic frame kit providing a set of magnet frames and optional decorative elements where the frame art area surface and or decorative element art area surface is printed with varying designs. The kit is utilized, generally by children, as an art project to encourage the development of artistic talents as well as for entertainment and amusement. The magnetic frame and kit concept described herein is similar to a coloring book wherein several pages are bound together and which may be colored by filling in different colors within design lines. A single sheet of magnetic frame kit material may provide several magnet frames demonstrated by viewing the printed designs on the frame art area surface bonded to a single sheet of magnetic frame material with the same concept relating to the providing of multiple decorative elements on a single sheet of magnetic frame kit material. The magnetic frames and or decorative elements, either individually or as a kit or set, will permit the child to cut along the frame perimeter and or decorative element perimeter as dictated by the design printed upon the frame art area surface. Where used in a kit or set the child will cut between the individual magnetic frames and or along a frame perimeter or a decorative element perimeter to select the particular magnetic frame and or decorative element to be colored.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DETAILED DESCRIPTION

Figure 1:
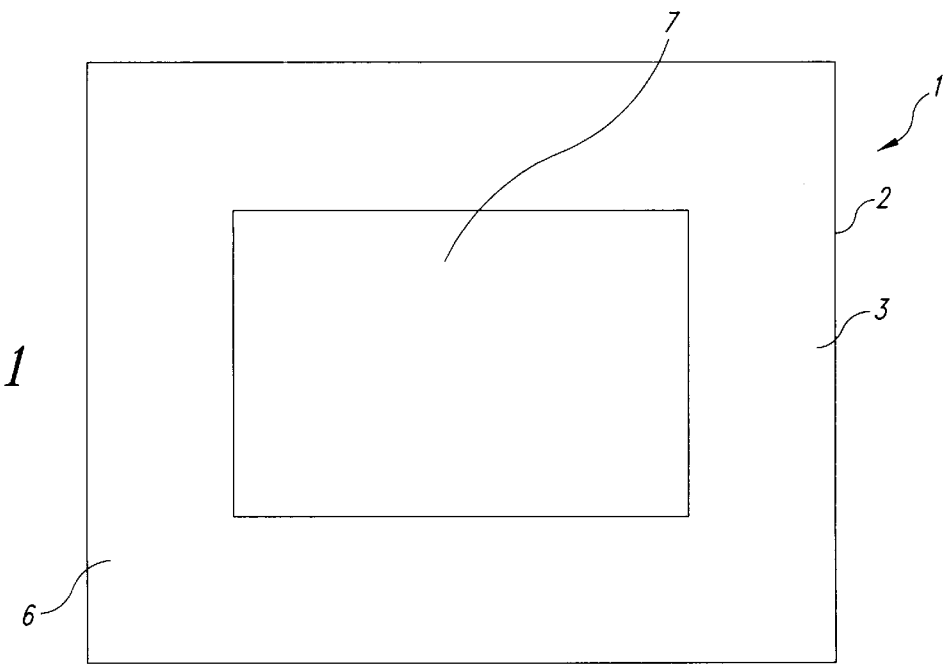
FIG. 1 is a plan view showing the invention art medium surface displaying the frame art area surface comprising a material upon which colors may be applied.
Figure 2:
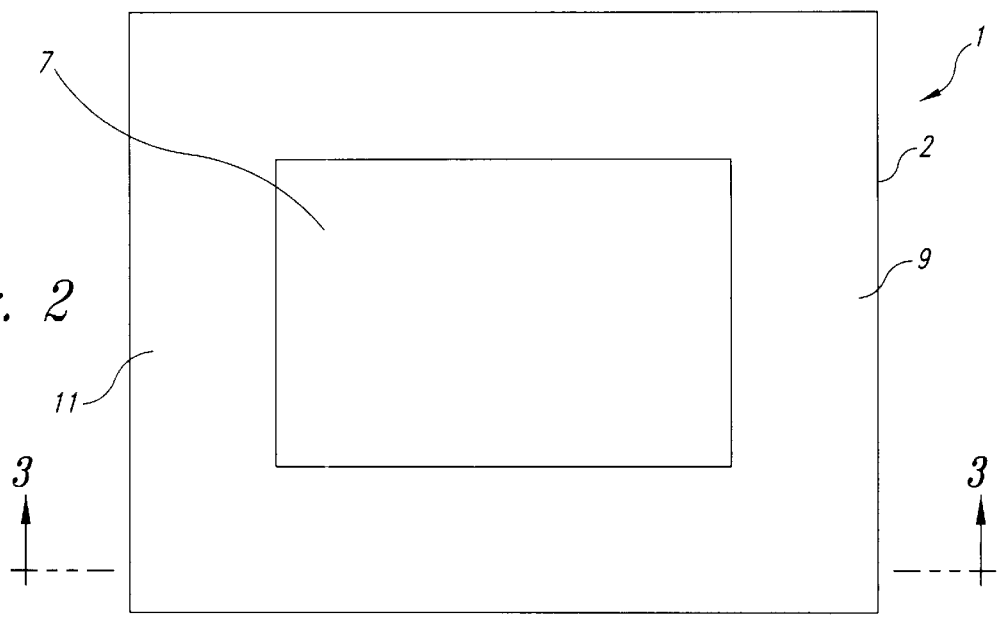
FIG. 2 is a plan view showing the invention magnetic surface comprising a flexible magnetic material which will attach to a ferrous surface.
Figure 3:
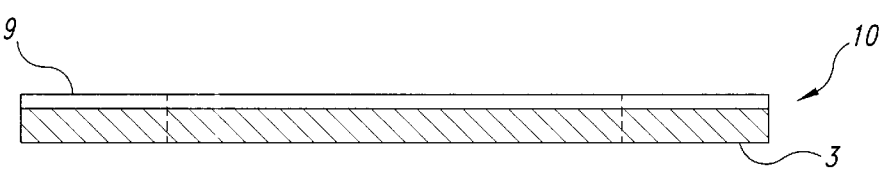
FIG. 3 is a section view along 3—3 of FIG. 2 which is representative of the magnetic frame kit material sheet.
Figure 4:
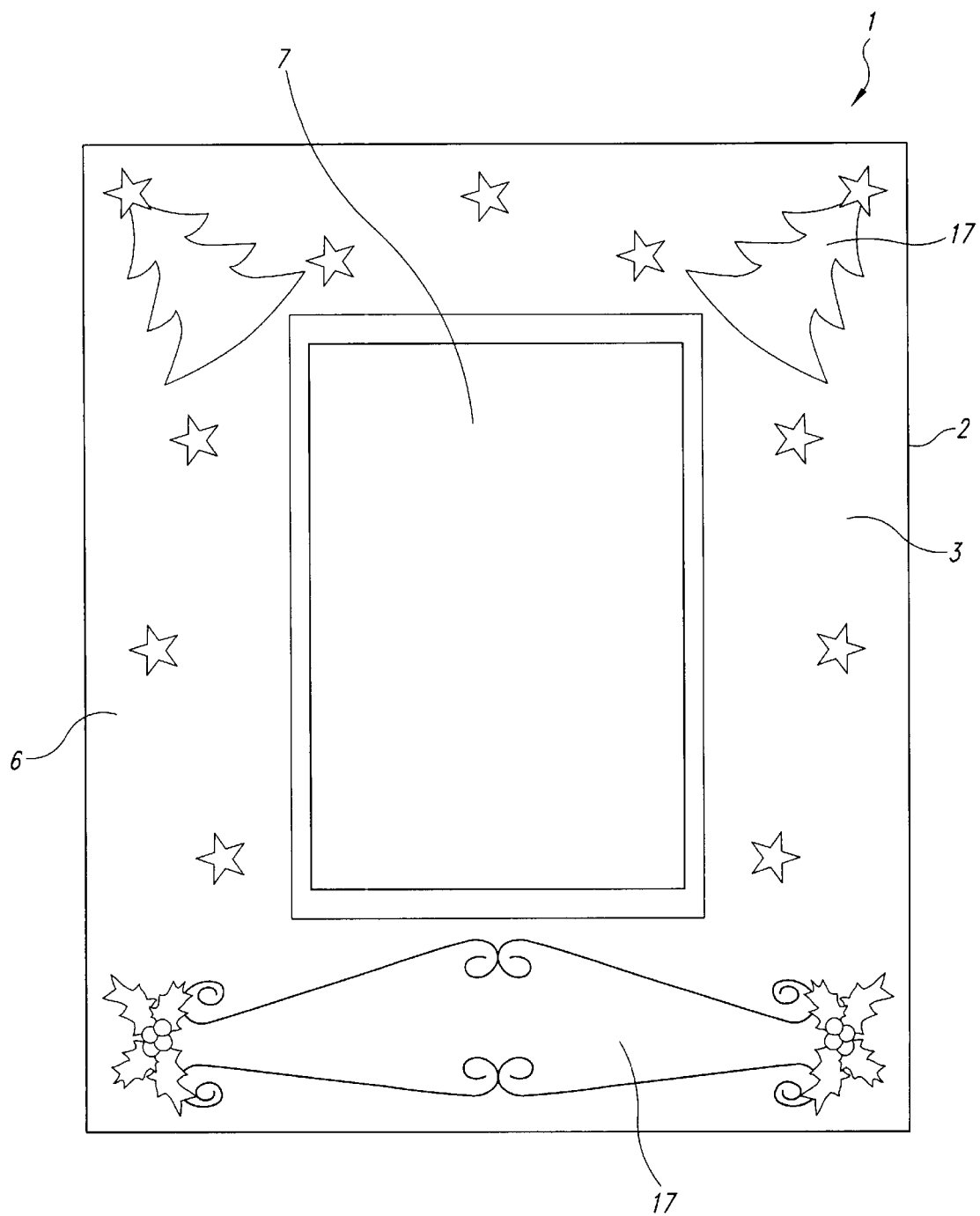
FIG. 4 is a plan view of the frame art area surface of the invention showing one of a variety of configurations of the frame shape of a generally rectangular format with a generally rectangular frame opening with the frame art area surface showing one of a variety of designs.
Figure 5:
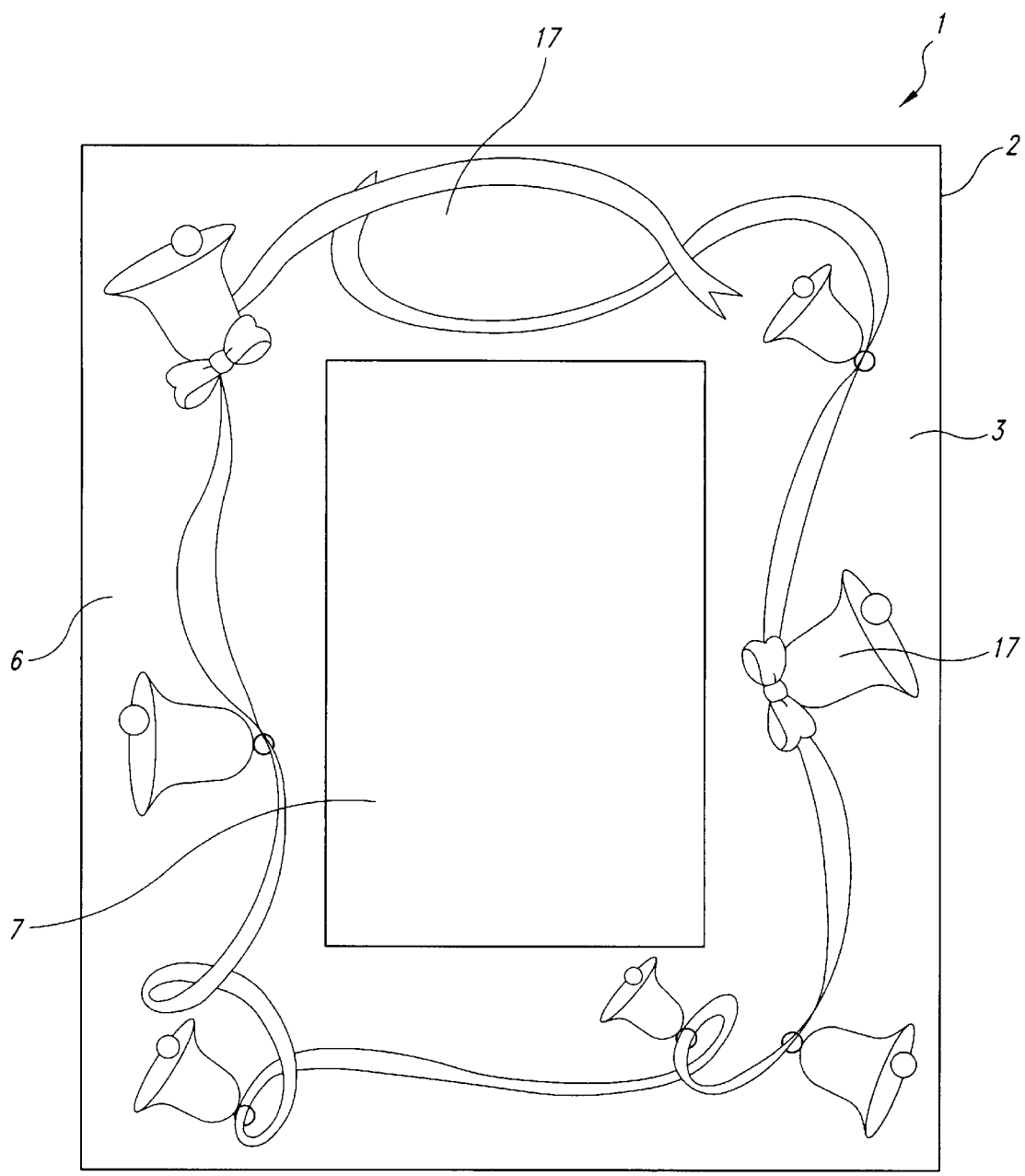
FIG. 5 is a plan view of the frame art area surface of the invention showing one of a variety of configurations of the frame shape of a generally rectangular format with a generally rectangular frame opening with the frame art area surface showing one of a variety of designs.
Figure 6:
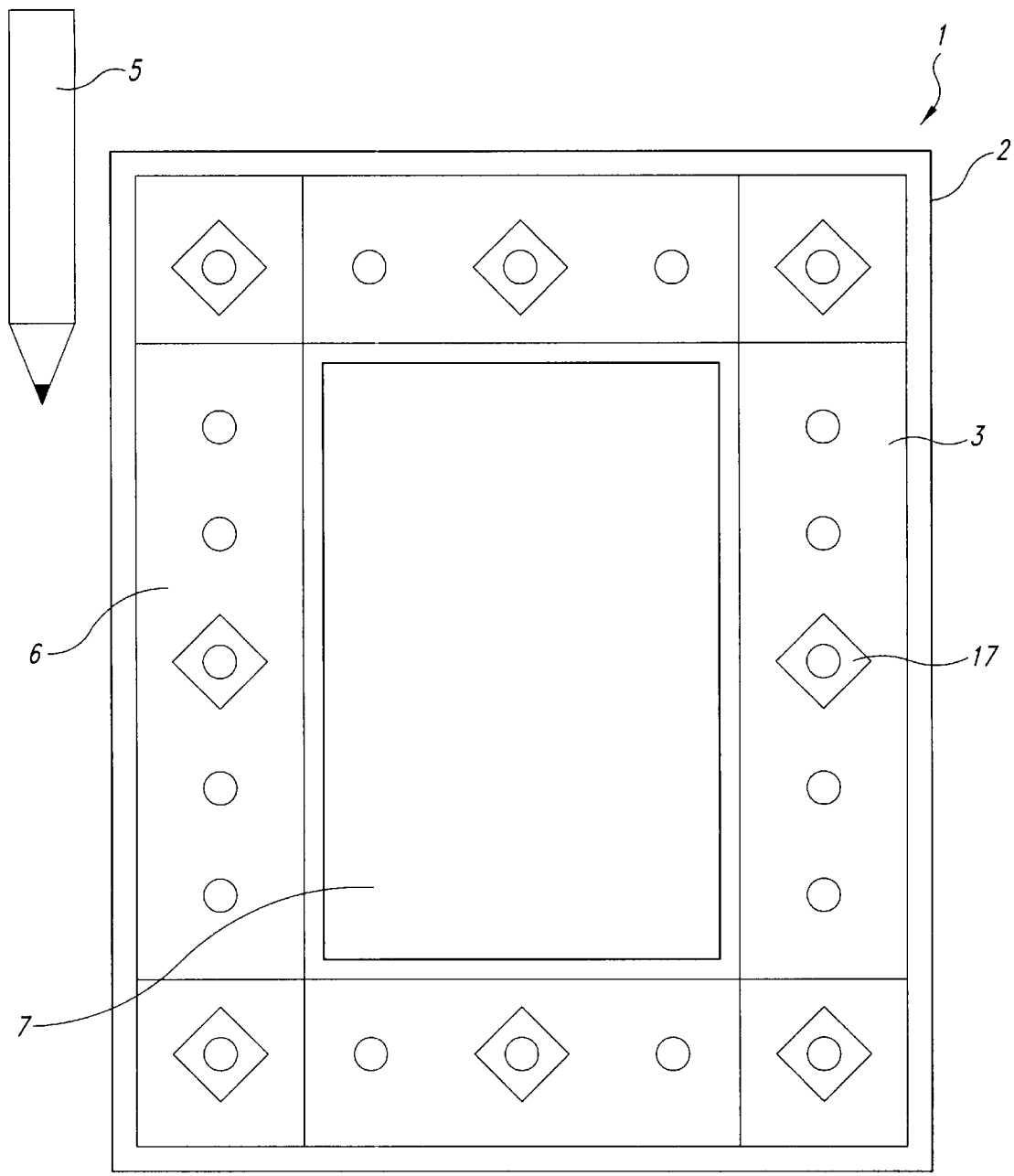
FIG. 6 is a plan view of the frame art area surface of the invention showing one of a variety of configurations of the frame shape of a generally rectangular format with a generally rectangular frame opening with the frame art area surface showing one of a variety of designs.
Figure 7:
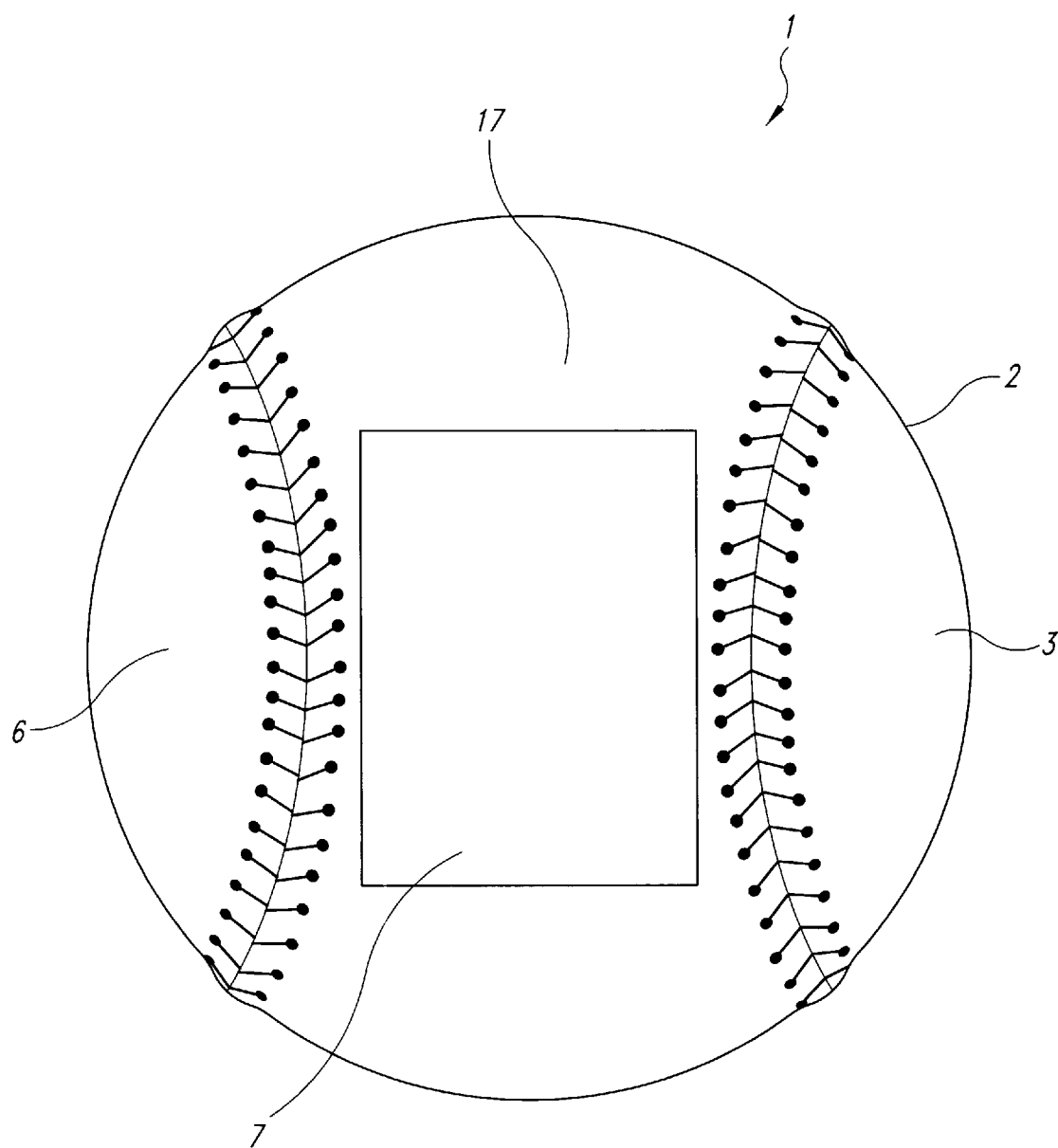
FIG. 7 is a plan view of the frame art area surface of the invention showing one of a variety of configurations of the frame shape of a generally circular format with a generally rectangular frame opening with the frame art area surface showing on of a variety of designs.
Figure 8:
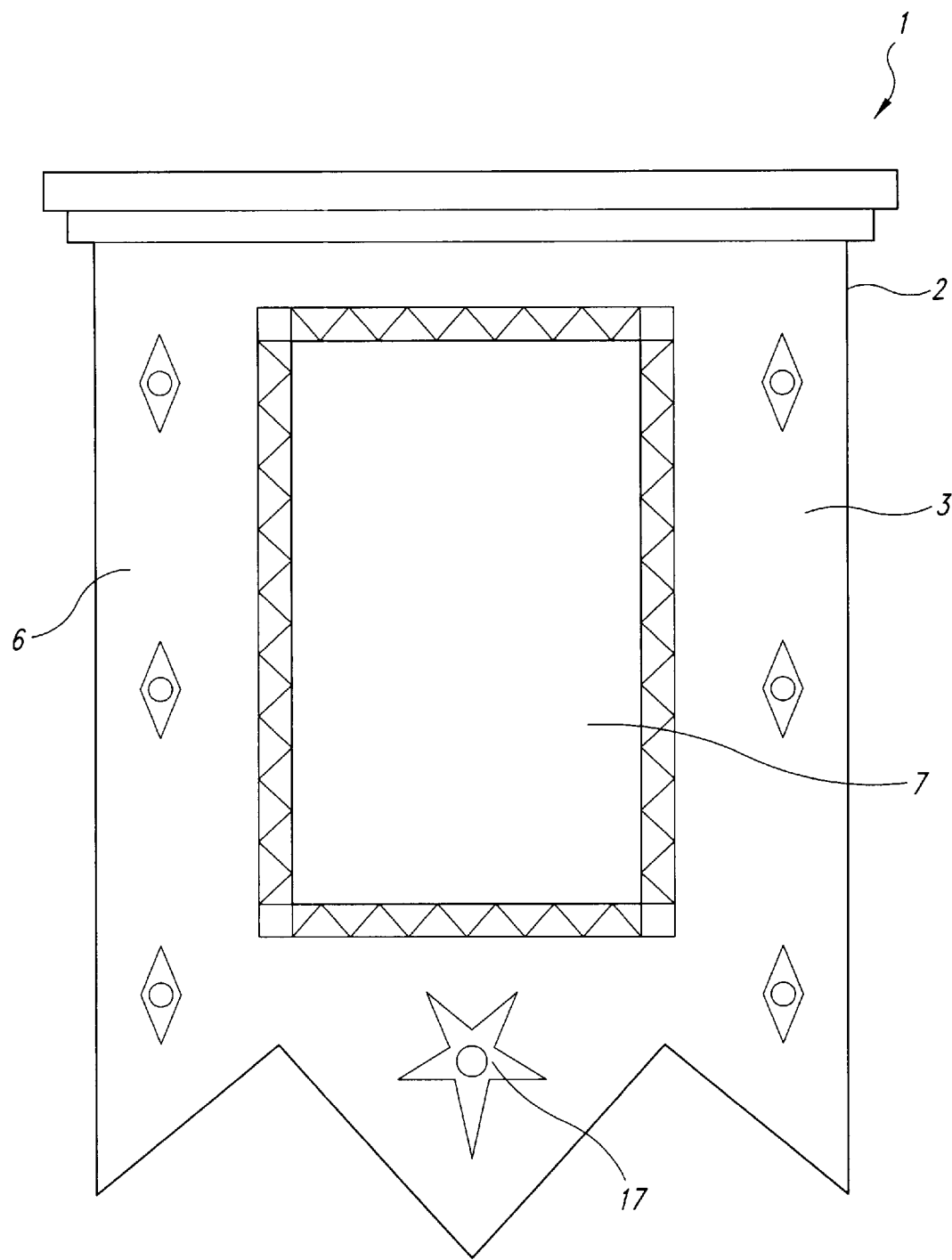
FIG. 8 is a plan view of the frame art area surface of the invention showing one of a variety of configurations of the frame shape of a generally irregular geometrical format with a generally rectangular frame opening with the frame art area surface showing on of a variety of designs.
Figure 9:
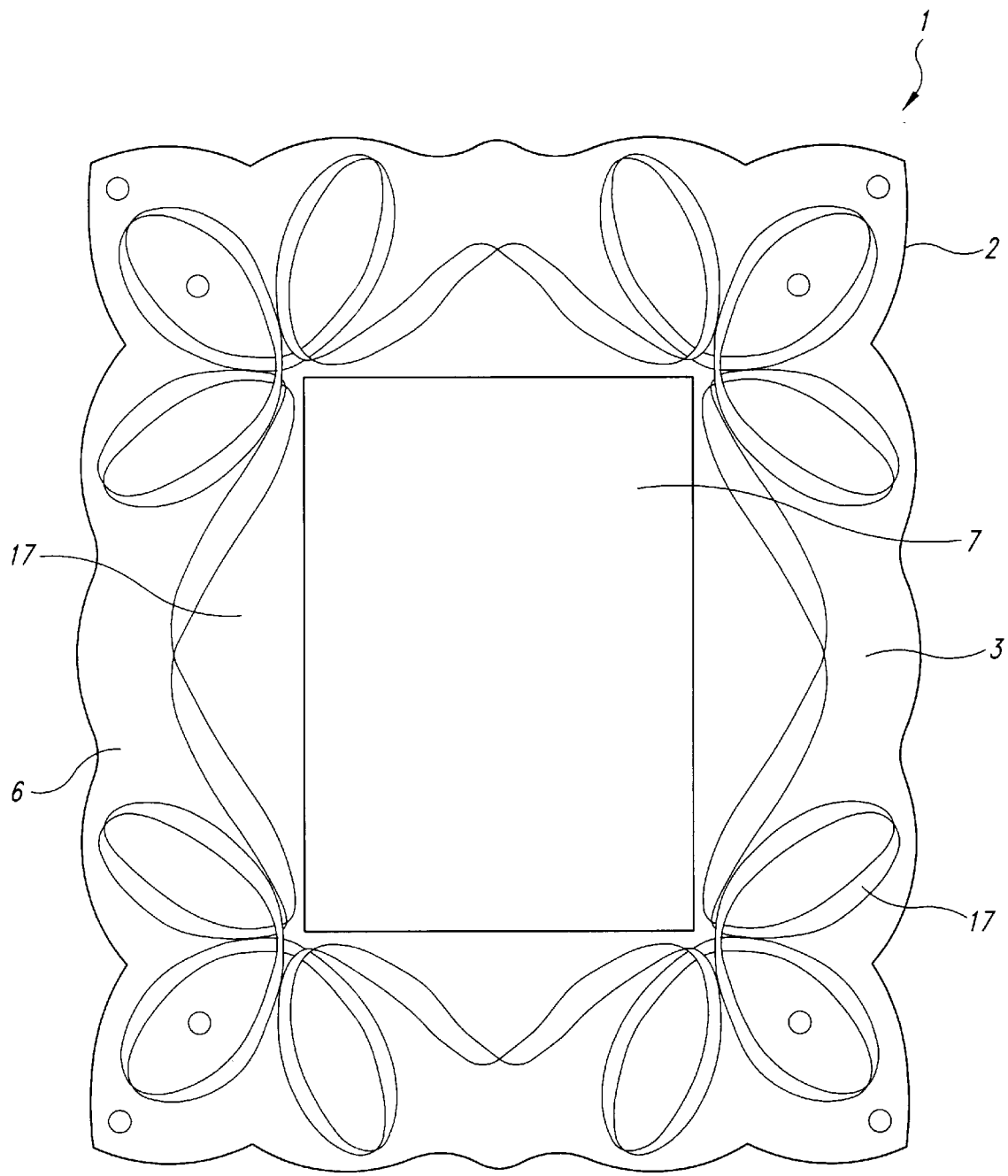
FIG. 9 is a plan view of the frame art area surface of the invention showing one of a variety of configurations of the frame shape of a generally irregular geometrical format with a generally rectangular frame opening with the frame art area surface showing on of a variety of designs.

FIGS. 1 through 11 illustrate embodiments of the invention wherein a magnetic frame kit material sheet 10 is composed of two layers; one layer being a flexible magnetic material 9 and a second layer being an art medium 3 generally comprised, for example as in this disclosure, of paper which is bonded, by bonding means such as glues or adhesives, to the flexible magnetic material 9. The art medium 3 layer will have a frame art area surface 6 or decorative element art area surface 20 upon which colors and art may be applied. Where the design is in the form of a frame there will be depicted a magnetic frame 1, having a frame perimeter 2, a frame art area surface 6 and a frame opening 7. Where the design is in the form of decorative elements 17 there will be depicted decorative elements 17 having decorative element perimeters 18 and decorative element art area surface 20. The frame opening 7, in the magnetic frame kit material sheet 10 prior to removal, is generally centrally positioned within each magnetic frame 1 and when removed comprises a generally centralized aperture within the magnetic frame 1 extending from the magnetic surface 11 to the frame art area surface 6 and forms the area within which is displayed a variety of art works, photographs and other visual art compositions. The preferred embodiment of the magnetic frame kit 14 is formed of a magnetic frame kit material 10 sheets having one or a plurality of designs of magnetic frames 1 and, optionally, decorative elements 17.

The flexible magnetic material 9 has a magnetic surface 11 while the art medium 3 has a frame art area surface 6 or decorative element art area surface 20 upon which designs and art may be applied with a variety of color substances 15 including color markers, crayons, colored pencils, paint, water color and other substances which normally may be applied to paper surfaces. The flexible magnetic material 9 is generally in a sheet formation of approximately ¹⁄₁₆ inch thickness which will be magnetically attracted to a ferrous surface such as that provided by most household refrigerators. The art medium 3, frame art area surface 6 and decorative element art area surface 20, in the preferred embodiment, is composed of paper, but may be any material which will accept color substances and which may be bonded to a flexible magnetic material 9. The disclosure of the magnetic frame 1 will have a variety of irregular and regular geometrical shapes and as will the frame opening 7.

The frame art area surface 6 will be of a variety of widths and may have printed designs which will suggest patterns to be colored. The magnetic frame kit 14 will have a plurality of magnetic frames 1 and a plurality of decorative elements 17 on single magnetic frame kit material 10 sheets.

Figure 10:
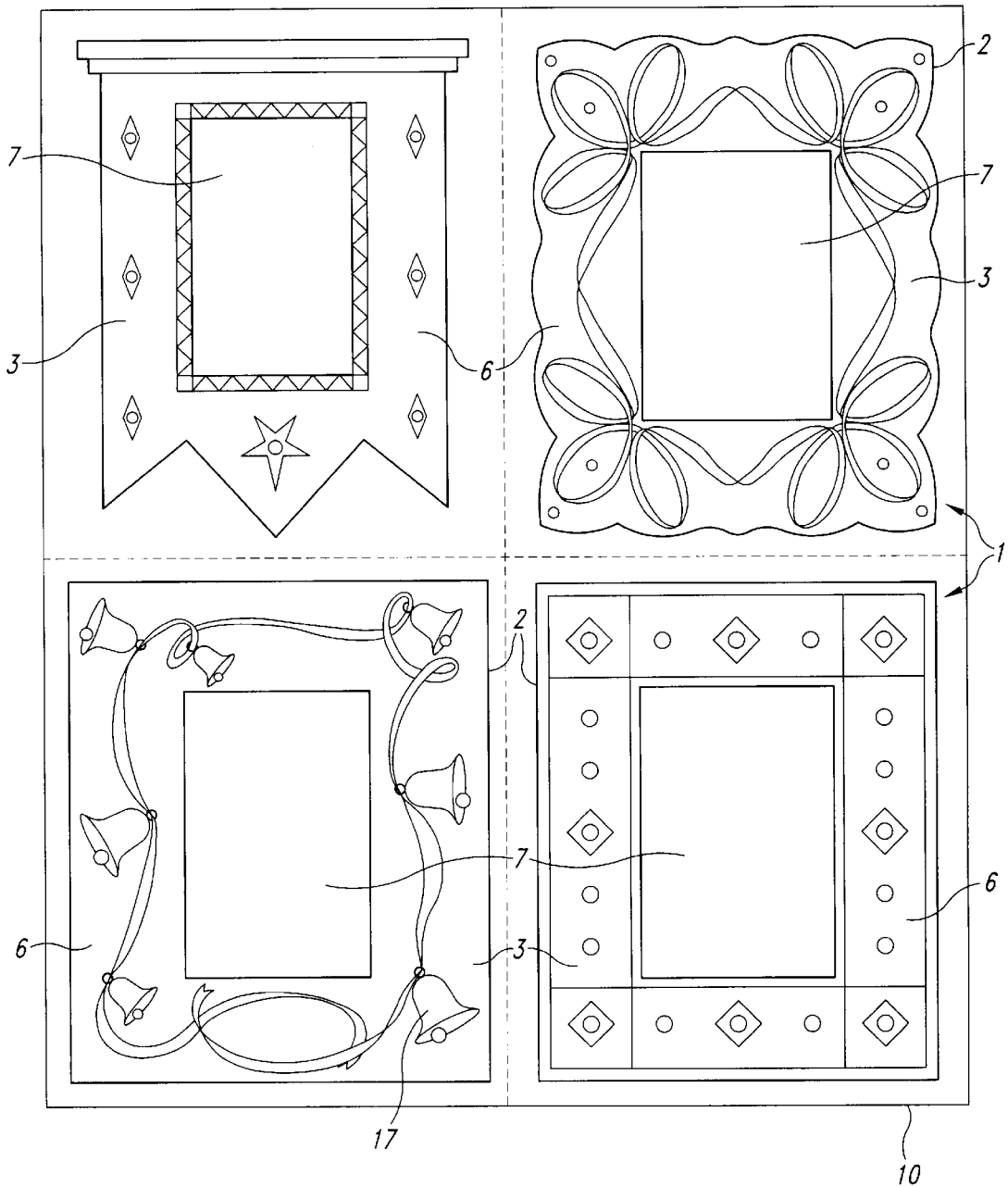
FIG. 10 is a plan view showing four magnetic frames on a single sheet as generally found in a magnetic frame kit.
Figure 11:
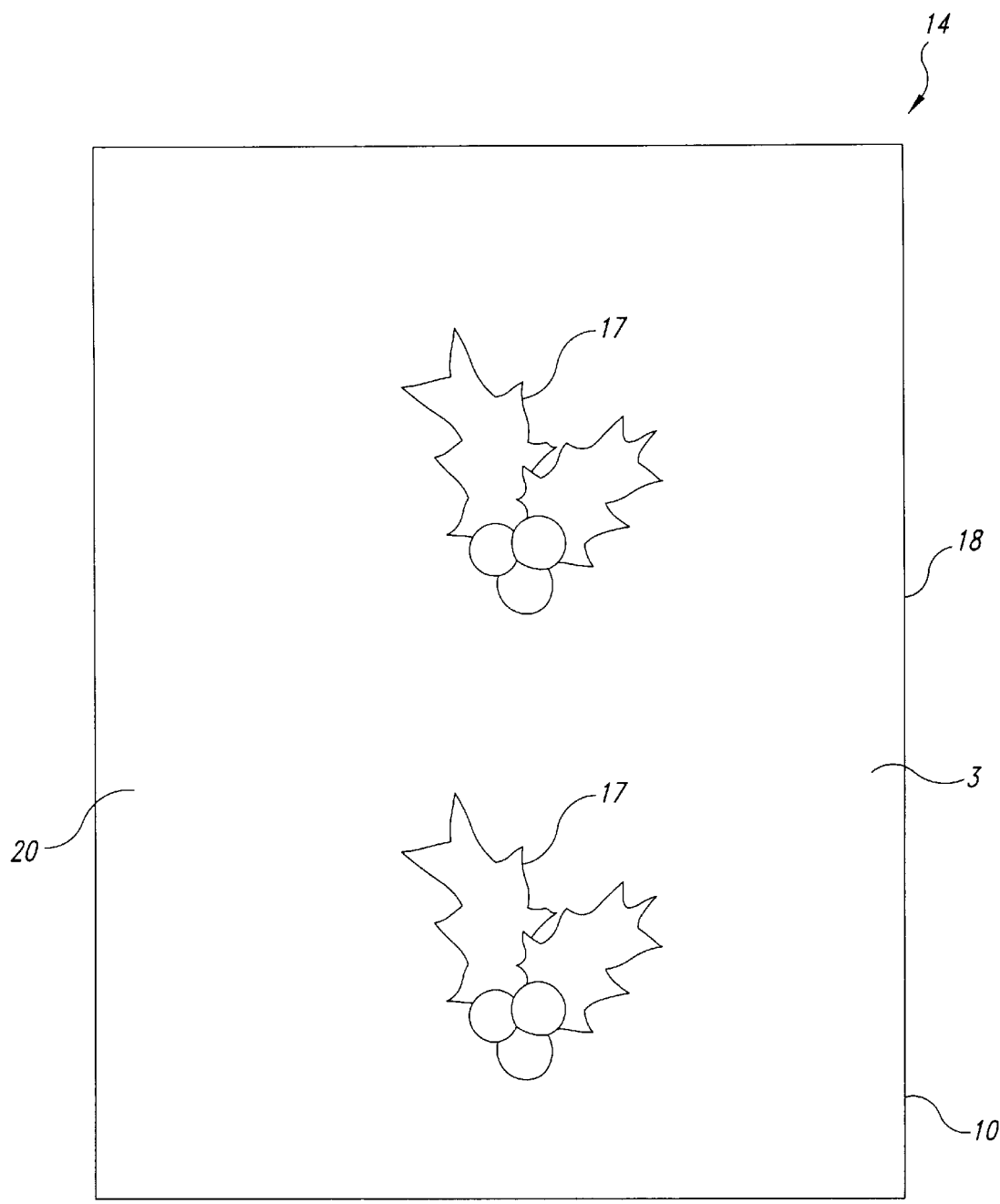
FIG. 11 is a plan view showing an example of decorative elements printed on a decorative art area surface of a magnetic frame kit material sheet demonstrating a holly leaf and holly berry design as an example of the type of decorative element designs available in the magnetic frame kit.

A principal purpose of this invention is to present a set of magnet frames 1 and, optionally, decorative elements 17, with varying designs for coloring or art work, for example by a child. The set, generally utilized by children, provided by the magnetic frame kit 14, forms an art project which encourages the development of artistic talents as well as for entertainment and amusement. The concept described herein is similar to a coloring book wherein several pages are bound together and which may be colored by filling in different colors within design lines. A single magnetic frame kit material 10 sheet composed of the layered flexible magnetic material and art medium may provide designs of several magnet frames 1, as illustrated in FIG. 10, or designs of decorative elements 17, as illustrated in FIG. 11.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method of making a flexible magnetic art product by a user comprising the steps of:

providing to the user a sheet of a magnetic art medium having a sheet of first material and a sheet of second material adhered together, the sheet of first material being magnetic and the sheet of second material being an art medium capable of permanently receiving a colored substance thereon;

permanently applying by the user a colored substance to the sheet of second material at a selected first portion of the sheet of magnetic art medium, the sheet of second material having a selected design printed thereon to define a decorative element having a perimeter, and applying the colored substance includes applying the colored substance within the perimeter of the decorative element; and magnetically attaching the sheet of magnetic art medium to a ferrous surface.

2. The method of claim 1 further comprising the step of separating the selected first portion of the sheet of magnetic art medium from a second portion of the sheet of magnetic art medium.

3. The method of claim 2 wherein the step of separating includes cutting the sheet of magnetic art medium to separate the first and second portions.

4. The method of claim 1 wherein the magnetic art medium has a frame aperture therein and further comprising the step of placing a picture adjacent to the sheet of first material with the frame aperture extending around at least a portion of the picture and placing the magnetic art medium and picture as a unit against the ferrous surface.

5. A flexible laminated magnetic art product made by a user by the process comprising the steps of:

providing to the user a sheet of magnetic art medium having a sheet of first material and a sheet of second material adhered together, the sheet of first material being magnetic and the sheet of second material being an art medium capable of permanently receiving a colored substance thereon, the sheet of second material has a selected design printed thereon to define a decorative element having a perimeter; and permanently applying by the user a colored substance to the sheet of second material within the perimeter of the decorative element.

6. The flexible laminated magnetic art product of claim 5 wherein the process further includes the step of separating a selected first portion of the sheet of magnetic art medium from a second portion of the sheet of magnetic art medium.

7. The flexible laminated magnetic art product of claim 5 wherein the magnetic art medium has a frame aperture therein and wherein the process further includes the step of placing a picture adjacent to the sheet of first material with the frame aperture extending around at least a portion of the picture and placing the magnetic art medium and picture as a unit against the ferrous surface.

\* \* \* \* \*